(12) United States Patent
Barath

(10) Patent No.: US 10,309,527 B2
(45) Date of Patent: Jun. 4, 2019

(54) CONTINUOUSLY VARIABLE TRANSMISSION AND SYSTEM AND METHOD OF CONTROL BASED ON A ZEROED-OUT WHEEL SLIP

(71) Applicant: GM GLOBAL TECHNOLOGY OPERATIONS LLC, Detroit, MI (US)

(72) Inventor: Alexander S Barath, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 15/244,760

(22) Filed: Aug. 23, 2016

(65) Prior Publication Data

US 2018/0058573 A1    Mar. 1, 2018

(51) Int. Cl.
| | |
|---|---|
| *F16H 61/02* | (2006.01) |
| *F16H 59/44* | (2006.01) |
| *F16H 59/46* | (2006.01) |
| *F16H 61/662* | (2006.01) |
| *F16H 59/66* | (2006.01) |

(52) U.S. Cl.
CPC ......... *F16H 61/0213* (2013.01); *F16H 59/44* (2013.01); *F16H 59/46* (2013.01); *F16H 61/66272* (2013.01); *F16H 59/66* (2013.01); *F16H 2059/465* (2013.01); *F16H 2061/0239* (2013.01); *F16H 2061/66277* (2013.01)

(58) Field of Classification Search
CPC ...... F16H 59/44; F16H 59/46; F16H 61/0213; F16H 61/66272
See application file for complete search history.

(56) References Cited

U.S. PATENT DOCUMENTS

| | | |
|---|---|---|
| 7,092,810 B2 | 8/2006 | Bauerle et al. |
| 7,188,717 B2 | 3/2007 | Hoshiya et al. |
| 7,363,138 B2 | 4/2008 | Bauerle et al. |

(Continued)

OTHER PUBLICATIONS

US Application Filing date Jan. 25, 2016; U.S. Appl. No. 15/005,293, Applicant: GM Global Technology Operations LLC; Title: System and Method for Calculating Vehicle Speed and Controlling a Continuously Variable Transmission.

(Continued)

*Primary Examiner* — Edwin A Young

(57) ABSTRACT

A continuously variable transmission (CVT), a transmission control system, and a method is provided. The control system is configured to determine a measured wheel speed of two driven wheels and a first driving wheel, calculate a first driving wheel expected speed based on the driven wheel measured speeds, a track width, and a wheel base, and calculate an actual wheel speed difference between the first driving wheel measured speed and the additional wheel measured speed. The additional wheel can be either of the driven wheels or a second driving wheel. The control system is also configured to calculate a theoretical wheel speed difference between the first driving wheel expected speed and the additional wheel measured speed, calculate a zeroed-out wheel slip based on the difference between the actual wheel speed difference and the theoretical wheel speed difference, and determine whether the zeroed-out wheel slip exceeds a predetermined threshold.

17 Claims, 4 Drawing Sheets

(56) References Cited

U.S. PATENT DOCUMENTS

| | | | |
|---|---|---|---|
| 7,543,670 B2 | 6/2009 | Tamai et al. | |
| 7,666,110 B2 | 2/2010 | Iwatsuki et al. | |
| 7,765,048 B2 | 7/2010 | Suzuki et al. | |
| 7,917,272 B2 | 3/2011 | Suzuki et al. | |
| 8,010,266 B2 | 8/2011 | Lee | |
| 8,311,714 B2 | 11/2012 | Jess et al. | |
| 8,594,898 B2 | 11/2013 | Totsuka | |
| 8,738,246 B2 | 5/2014 | Takemori et al. | |
| 9,151,382 B2 | 10/2015 | Zhang et al. | |
| 9,482,339 B2 | 11/2016 | Nohara et al. | |
| 2011/0315459 A1* | 12/2011 | Zuchoski | B60W 50/082 180/9.21 |
| 2013/0085036 A1* | 4/2013 | Anderson | B60W 10/06 477/110 |
| 2014/0297142 A1* | 10/2014 | Kojima | F16H 61/66259 701/58 |
| 2015/0345631 A1 | 12/2015 | Zhang et al. | |

OTHER PUBLICATIONS

US Application Filing date Sep. 6, 2016; U.S. Appl. No. 15/256,808, Applicant: GM Global Technology Operations LLC; Title: Continuously Variable Transmission and System and Method of Control for High Torque Events.

US Application Filing date Nov. 18, 2015; U.S. Appl. No. 14/944,459, Applicant: GM Global Technology Operations LLC; Title: Method and Apparatus to Control a Continuously Variable Transmission.

US Application Filing date Nov. 18, 2015; U.S. Appl. No. 14/944,462, Applicant: GM Global Technology Operations LLC; Title: Method and Apparatus to Control a Continuously Variable Transmission.

US Application Filing date Nov. 9, 2015; U.S. Appl. No. 14/935,580, Applicant: GM Global Technology Operations LLC; Title: Method and Apparatus to Control a Continuously Variable Transmission.

US Application Filing date Nov. 18, 2015; U.S. Appl. No. 14/944,680, Applicant: GM Global Technology Operations LLC; Title: Transmission Ratio Control Systems and Methods.

US Application Filing date Nov. 9, 2015; U.S. Appl. No. 14/935,575, Applicant: GM Global Technology Operations LLC; Title: Method and Apparatus to Control a Continuously Variable Transmission.

US Application Filing date Oct. 19, 2015; U.S. Appl. No. 14/886,366, Applicant: GM Global Technology Operations LLC; Title: Method and Apparatus to Control a Continuously Variable Transmission.

US Application Filing date Jun. 7, 2016; U.S. Appl. No. 15/175,350, Applicant: GM Global Technology Operations LLC; Title: Real-Time Driver-Controlled Dynamic Vehicle Balance Control System.

* cited by examiner

CONTINUOUSLY VARIABLE TRANSMISSION AND SYSTEM AND METHOD OF CONTROL BASED ON A ZEROED-OUT WHEEL SLIP

TECHNICAL FIELD

The present disclosure pertains to a continuously variable transmission (CVT), a transmission control system, and a method for controlling the CVT.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within the calibrated range of speed ratios. A typical variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly, depending on the configuration.

In order to vary a CVT speed ratio and to transfer torque to the drivetrain, a clamping force may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT. A clamping force may also applied to transfer a desired amount of torque from one pulley to another through the continuous member, where the amount of clamping force applied is intended to prevent the continuous member from slipping on the pulleys.

A CVT control system can be programmed to respond to outside events, such as wheel slip. When the wheels are slipping, this may be an indication that the variator assembly will soon require additional torque carrying capacity due to a spike or disturbance in output torque. Accordingly, a CVT control system may apply additional clamping pressure to the CVT pulleys when detecting wheel slip, to prevent the continuous member from slipping. Such additional clamping pressure may not be needed, however, when the wheels are slipping, or rotating at different speeds, merely due to a turning maneuver being completed by the vehicle.

SUMMARY

The present disclosure provides a control system that subtracts wheel slip (or wheel speed differences) that are due merely to turning of the vehicle from actual wheel slip due to road disturbances or low friction, in order to arrive at a more accurate measurement of actual wheel slip that is not due to turning. The CVT protection system can be programmed to respond to a lower amount of wheel slip, because the wheel slip being responded to is actual wheel slip and not wheel speed differences due to turning.

In one form, which may be combined with or separate from the other forms disclosed herein, a method for controlling a continuously variable transmission (CVT) including a variator assembly for a motor vehicle is provided. The method includes steps of determining a measured wheel speed of a first driven wheel, determining a measured wheel speed of a second driven wheel, and determining a measured wheel speed of a first driving wheel. The method further includes calculating a first driving wheel expected speed based on the measured wheel speeds of the first and second driven wheels, a track width, and a wheel base. The method also includes calculating an actual wheel speed difference between the measured wheel speed of the first driving wheel and a measured wheel speed of an additional wheel, where the additional wheel is one of the following: the first driven wheel, the second driven wheel, and a second driving wheel. The method includes calculating a theoretical wheel speed difference between the first driving wheel expected speed and the measured wheel speed of the additional wheel. The method includes a step of calculating a zeroed-out wheel slip based on the difference between the actual wheel speed difference and the theoretical wheel speed difference. The method also includes determining whether the zeroed-out wheel slip exceeds a predetermined threshold.

In another form, which may be combined with or separate from the other forms disclosed herein, a transmission control system for controlling a continuously variable transmission (CVT) having a variator assembly is provided. The transmission control system includes an instruction set, the instruction set executable to: command an initial minimum clamping pressure to be applied to the variator assembly to achieve a desired torque capacity; determine a measured wheel speed of a first driven wheel; determine a measured wheel speed of a second driven wheel; determine a measured wheel speed of a first driving wheel; and calculate a first driving wheel expected speed based on the measured wheel speeds of the first and second driven wheels, a track width, and a wheel base. The control system is further executable to: calculate an actual wheel speed difference between the measured wheel speed of the first driving wheel and a measured wheel speed of an additional wheel. The additional wheel is one of the following: the first driven wheel, the second driven wheel, and a second driving wheel. The control system is also executable to: calculate a theoretical wheel speed difference between the first driving wheel expected speed and the measured wheel speed of the additional wheel; calculate a zeroed-out wheel slip based on the difference between the actual wheel speed difference and the theoretical wheel speed difference; and determine whether the zeroed-out wheel slip exceeds a predetermined threshold. If the zeroed-out wheel slip exceeds the predetermined threshold, the control system is executable to command an adjustment to the initial minimum clamping pressure applied to the variator assembly to compensate for the zeroed-out wheel slip.

In yet another form, which may be combined with or separate from the other forms disclosed herein, a transmission controller for controlling a continuously variable transmission (CVT) having a variator assembly is provided. The transmission controller includes a first control logic configured to determine a measured wheel speed of a first driven wheel, a measured wheel speed of a second driven wheel, and a measured wheel speed of a first driving wheel, and a second control logic configured to calculate a first driving wheel expected speed based on the measured wheel speeds of the first and second driven wheels, a track width, and a wheel base. The transmission controller further includes a third control logic configured to calculate an actual wheel speed difference between the measured wheel speed of the first driving wheel and a measured wheel speed of an additional wheel, where the additional wheel is one of the following: the first driven wheel, the second driven wheel, and a second driving wheel. The transmission controller includes a fourth control logic configured to calculate a theoretical wheel speed difference between the first driving wheel expected speed and the measured wheel speed of the additional wheel, and a fifth control logic configured to calculate a zeroed-out wheel slip based on the difference between the actual wheel speed difference and the theoretical wheel speed difference. A sixth control logic is configured to determine whether the zeroed-out wheel slip exceeds a predetermined threshold.

In still another form, which may be combined with or separate from the other forms disclosed herein, a continuously variable transmission (CVT) for a motor vehicle is provided. The CVT includes a variator assembly including a first pulley and a second pulley. The first and second pulleys are rotatably coupled by a continuous rotatable device. The first pulley is rotatably coupled to an input member, and the second pulley is rotatably coupled to an output member. The first pulley includes a first moveable sheave that is translatable along a first axis relative to a first stationary sheave in response to urging of a first actuator. The second pulley includes a second moveable sheave that is translatable along a second axis relative to a second stationary sheave in response to urging of a second actuator. The CVT also includes a control system having at least one controller and one or more sensors in communication with the controller. The control system includes an instruction set, wherein the instruction set is executable to: determine a measured wheel speed of a first driven wheel; determine a measured wheel speed of a second driven wheel; determine a measured wheel speed of a first driving wheel; and calculate a first driving wheel expected speed based on the measured wheel speeds of the first and second driven wheels, a track width, and a wheel base. The instruction set is further executable to: calculate an actual wheel speed difference between the measured wheel speed of the first driving wheel and a measured wheel speed of an additional wheel. The additional wheel is one of the following: the first driven wheel, the second driven wheel, and a second driving wheel. The instruction set is also executable to: calculate a theoretical wheel speed difference between the first driving wheel expected speed and the measured wheel speed of the additional wheel; calculate a zeroed-out wheel slip based on the difference between the actual wheel speed difference and the theoretical wheel speed difference; and determine whether the zeroed-out wheel slip exceeds a predetermined threshold.

Additional features may be included with the disclosed method, controller, control system, and/or CVT, such as: the method or controller/control system/CVT being configured to, or having a control logic to, command an initial minimum clamping pressure to be applied to the variator assembly to achieve a desired torque capacity; the method or controller/control system/CVT being configured to, or having a control logic to, command an adjustment to the initial minimum clamping pressure to compensate for the zeroed-out wheel slip if the zeroed-out wheel slip exceeds the predetermined threshold; and the first driving wheel expected speed being calculated using the following equation:

$$VP1 = \frac{\sqrt{(L*DV)^2 + (T*VD1)^2}}{T}$$

where VP1 is the first driving wheel expected speed, L is the wheel base, DV is the absolute value of the difference between the measured wheel speed of the first driven wheel and the measured wheel speed of the second driven wheel, T is the track width, and VD1 is the measured wheel speed of the first driven wheel; and in some cases, the additional wheel is the first driven wheel.

Further additional features may be provided in connection with the disclosed method, control system, controller, or CVT, such as the method or controller/control system/CVT being configured to, or having a control logic to, calculate a second driving wheel expected speed based on the measured wheel speeds of the first and second driven wheels, the track width, and the wheel base; the method or controller/control system/CVT being configured to, or having a control logic to, calculate a second actual wheel speed difference between the measured wheel speed of the second driving wheel and the measured wheel speed of the second driven wheel; the method or controller/control system/CVT being configured to, or having a control logic to, calculate a second theoretical wheel speed difference between the second driving wheel expected speed and the measured wheel speed of the second driven wheel; the method or controller/control system/CVT being configured to, or having a control logic to, calculate a second zeroed-out wheel slip based on the difference between the second actual wheel speed difference and the second theoretical wheel speed difference; the method or controller/control system/CVT being configured to, or having a control logic to, determine whether the second zeroed-out wheel slip exceeds a second predetermined threshold; and the method or controller/control system/CVT being configured to, or having a control logic to, command an adjustment to the initial minimum clamping pressure to compensate for the second zeroed-out wheel slip if the second zeroed-out wheel slip exceeds the second predetermined threshold.

Further additional features may be provided, such as the method or controller/control system/CVT being configured to, or having a control logic to, calculate a third actual wheel speed difference between the measured wheel speed of the second driving wheel and the measured wheel speed of the first driving wheel; the method or controller/control system/CVT being configured to, or having a control logic to, calculate a third theoretical wheel speed difference between the first driving wheel expected speed and the measured wheel speed of the second driving wheel; the method or controller/control system/CVT being configured to, or having a control logic to, calculate a third zeroed-out wheel slip based on the difference between the third actual wheel speed difference and the third theoretical wheel speed difference; the method or controller/control system/CVT being configured to, or having a control logic to, determine whether the third zeroed-out wheel slip exceeds a third predetermined threshold; and the method or controller/control system/CVT being configured to, or having a control logic to, command an adjustment to the initial minimum clamping pressure to compensate for the third zeroed-out wheel slip if the third zeroed-out wheel slip exceeds the third predetermined threshold.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
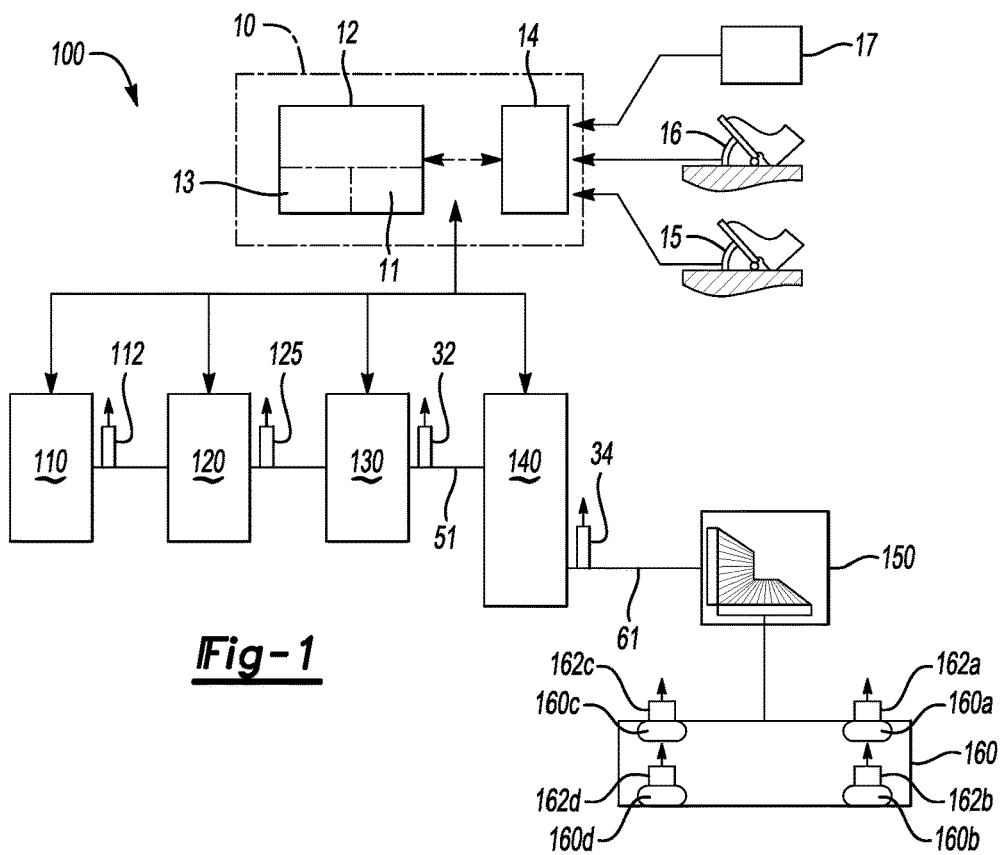
FIG. 1 is a schematic illustration of a motor vehicle propulsion system that includes an internal combustion engine rotatably coupled to a continuously variable transmission (CVT) via a torque converter and a gear box, in accordance with the principles of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 schematically illustrates elements of a motor vehicle propulsion system 100 that includes an engine 110, such as an internal combustion engine, rotatably coupled to a continuously variable transmission (CVT) 140 via a torque converter 120 and a gear box 130. The motor vehicle propulsion system 100 couples via a driveline 150 to a set of motor vehicle wheels 160 to provide tractive effort when employed on a vehicle. Operation of the motor vehicle propulsion system 100 may be monitored and controlled by a control system 10 in response to driver commands and other vehicle operation factors. The motor vehicle propulsion system 100 may be part of a device which may be a vehicle, a robot, farm implement, sports-related equipment or any other transportation device.

The engine 110 may be any suitable engine, such as an internal combustion engine capable of transforming hydrocarbon fuel to mechanical power to generate torque in response to commands originating from the control system 10. The engine 110 may also or alternatively include an electric motor (not shown). The torque converter 120 may be a device providing fluidic coupling between its input and output members for transferring torque.

The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative examples, either or both the torque converter 120 and the gear box 130 may be omitted.

The gear box 130 includes an output member that rotatably couples to the CVT 140 via an input member 51. One example of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gear set, a chain drive gear set or another suitable gear arrangement for transferring torque to one or more vehicle wheels 160.

The motor vehicle propulsion system 100 preferably includes one or more sensors or sensing devices for monitoring rotational speeds of various devices, including, e.g., an engine speed sensor 112, a torque converter turbine speed sensor 125, a CVT variator input speed sensor 32, a CVT variator output speed sensor 34, and wheel speed sensors 162a-d for each wheel 160a-160d of the set of wheels 160. Each of the aforementioned speed sensors may be any suitable position/speed sensing device, such as a Hall-effect sensor. Each of the aforementioned speed sensors communicates with the control system 10. As used herein the term 'speed' and related terms refer to a rotational speed of a rotating member, unless specifically indicated otherwise. As used herein the term 'position' and related terms refer to a rotational or angular position of a rotating member, unless specifically indicated otherwise.

The control system 10 preferably includes at least one controller 12 and may include a user interface 14. A single controller 12 is shown for ease of illustration. The controller 12 may include a plurality of controller devices wherein each of the controllers 12 may be associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch.

The controller 12 preferably includes at least one processor and at least one memory device 11 (or any non-transitory, tangible computer readable storage medium) on which are recorded instructions for executing instruction sets for controlling the CVT 140, and a memory cache 13. The memory device 11 can store controller-executable instruction sets, and the processor can execute the controller-executable instruction sets stored in the memory 11.

The user interface 14 communicates with and monitors operator input devices including, e.g., an accelerator pedal 15, a brake pedal 16, and a transmission gear selector 17. The user interface 14 determines an operator torque request based upon the aforementioned operator inputs. In one example, the transmission gear selector 17 includes a tap-up/tap-down feature, whereby a vehicle operator may manually select a transmission gear ratio, thus overriding transmission control.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
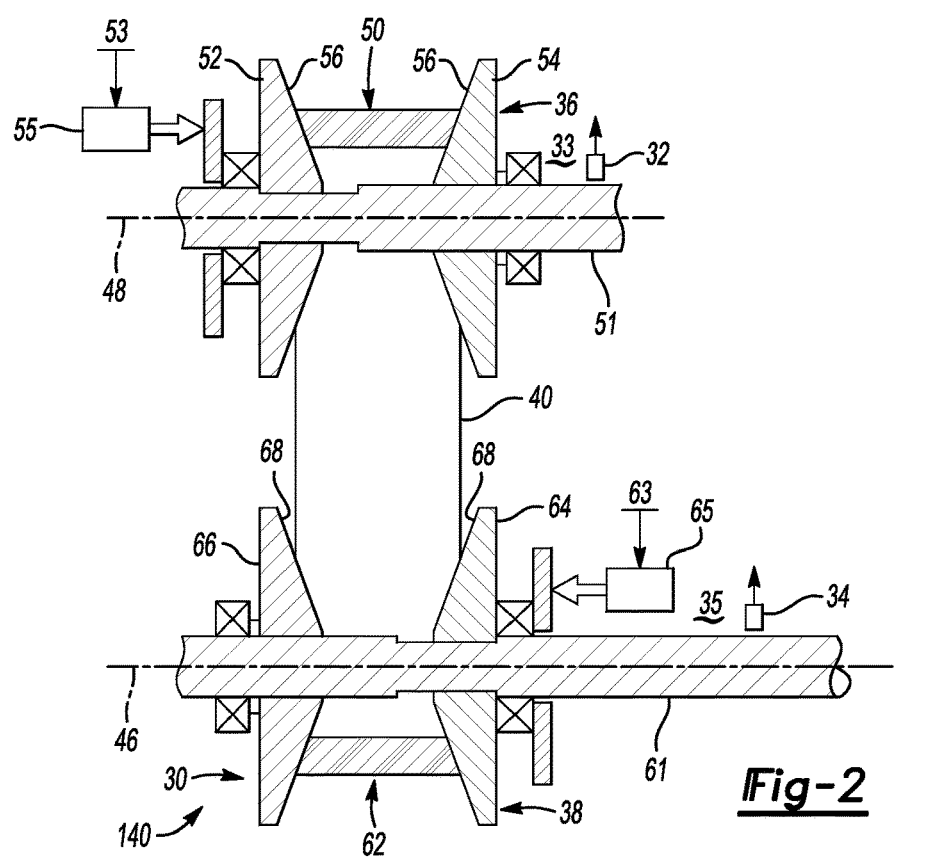
FIG. 2 schematically illustrates additional elements of the CVT shown in FIG. 1, according to the principles of the present disclosure.

FIG. 2 schematically illustrates elements of a variator assembly or variator assembly 30 of a chain-type or belt-type continuously variable transmission (CVT) 140 that may be advantageously controlled by the control system 10. The variator 30 transfers torque between the first rotating member 51, or input member, and the second rotating member 61, or output member.

The variator assembly 30 includes a first, or primary pulley 36, a second, or secondary pulley 38, and a continuous rotatable device 40, such as a belt, or any flexible continuous rotating device, that rotatably couples the first and second pulleys 36, 38 to transfer torque therebetween. The first pulley 36 rotatably attaches to the input member 51, the second pulley 38 rotatably attaches to the output member 61, and the rotatable device 40 may be adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. One of the first and second pulleys 36, 38 may act as a ratioing pulley to establish a speed ratio and the other of the first and second pulleys 36, 38 may act as a clamping pulley to generate sufficient clamping force to transfer torque therebetween. As used herein, the term 'speed ratio' refers to a variator speed ratio, which may be a ratio of a CVT output speed and a CVT input speed.

The first pulley 36 may be split perpendicular to the first axis 48 to define an annular first groove 50 that may be formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48 without allowing rotational movement about the first axis 48. The stationary first sheave 54 may be disposed opposite the moveable first sheave 52. The stationary first sheave 54 may be axially fixed to the input member 51 along the first axis 48. As such, the stationary first sheave 54 does not move in the axial direction of the first axis 48.

The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first groove surfaces 56 preferably form an inverted frustoconical shape such that a movement of the moveable first sheave 52 towards the stationary first sheave 54 increases an outer pulley diameter of the annular first groove 50. An actuator 55 may be arranged with the first pulley 36 to control an axial position of the moveable first sheave 52 in response to a drive signal 53, including urging the moveable first sheave 52 towards the stationary first sheave 54.

Similar to the first pulley 36, the second pulley 38 may be split perpendicular to the second axis 46 to define an annular second groove 62 therebetween. The annular second groove 62 may be disposed perpendicular to the second axis 46. The second pulley 38 includes a moveable sheave 64 and a stationary sheave 66. The moveable sheave 64 axially moves or translates along the second axis 46 relative to the stationary sheave 66, for example, along a spline on the output member 61.

The stationary second sheave 66 may be disposed opposite the moveable second sheave 64. The stationary second sheave 66 may be axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the second sheaves 64, 66 are disposed opposite each other to define the annular second groove 62 therebetween.

The opposed second groove surfaces 68 preferably form an inverted frustoconical shape such that a movement of the moveable second sheave 64 towards the stationary second sheave 66 increases an outer pulley diameter of the annular second groove 62. An actuator 65 may be arranged with the second pulley 38 to control an axial position of the moveable second sheave 64 in response to a driven signal 63, including urging the moveable second sheave 64 towards the stationary second sheave 66.

In one example, the actuators 55, 65 may be hydraulically-controlled device and the driven signals 53, 63 may be hydraulic pressure signals. A ratio of the outer pulley diameter of the first pulley 36 and the outer pulley diameter of the second pulley 38 defines a transmission torque ratio.

Other elements, such as clutch assemblies in the form of selectable one-way clutches and the like may be deployed between the variator 30 and other powertrain and driveline components and systems.

Figure 3:
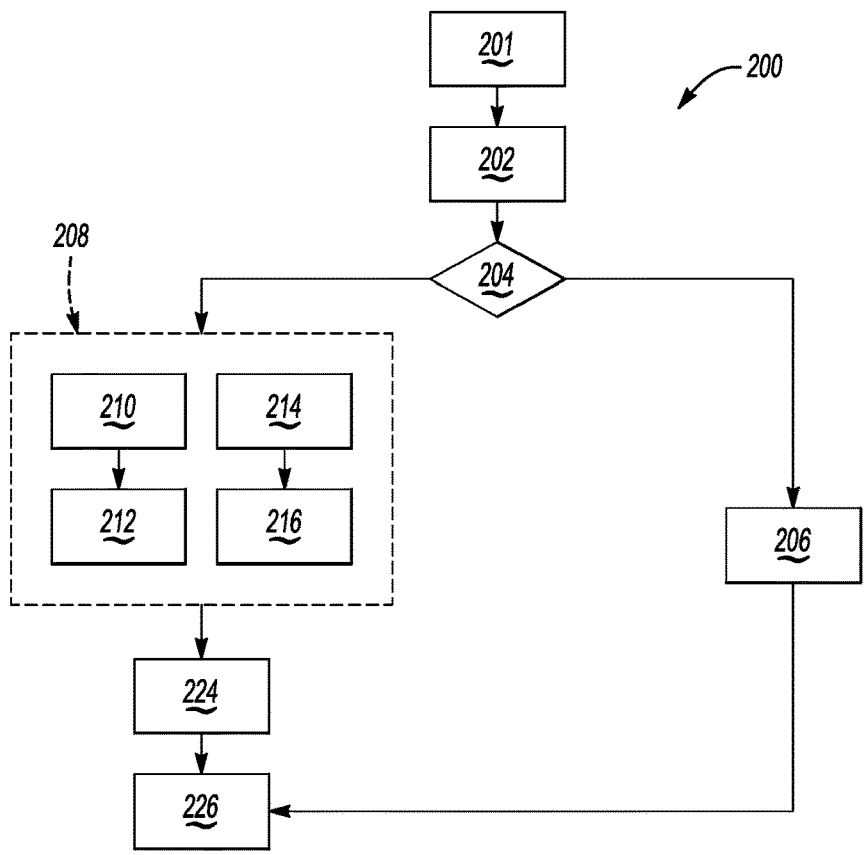
FIG. 3 schematically shows a block diagram of a CVT control system and method that can be employed to adjust the variator torque capacity and/or clamping pressure of the CVT of FIGS. 1-2 to control the CVT, in accordance with the principles of the present disclosure.

The control system 10 of FIG. 1 may be programmed to execute the steps of a method 200 as defined in FIG. 3 and as discussed in greater detail below. Referring now to FIG. 3, a flowchart of the method 200 stored on an instruction set and executable by the controller 12 of the control system 10 is shown. For example, the method 200 is a method for controlling a continuously variable transmission (CVT) including a variator assembly for a motor vehicle.

The method 200 may begin with step or block 201, where the method 200 includes applying an initial minimum clamping pressure to the variator assembly 30 of the CVT 140. For example, the step 201 may command that a clamping pressure for normal operating conditions be applied to the CVT 140 of the vehicle system 100.

In step or block 202, which is an optional step, the control system 10 may be programmed or configured to monitor and detect the operating state of the vehicle. The one or more sensors or sensing devices cooperate with the control system 10 to monitor the operational state of the vehicle. The one or more sensors monitoring at least one vehicle operation state may include, but not be limited to vehicle speed, engine speed, torque converter turbine speed, CVT variator input speed, CVT variator output speed, brake pedal actuation, accelerator pedal actuation, TCM gear state, vehicle acceleration, engine acceleration, and wheel speed sensors. The control system 10 may identify an initial variator torque capacity and evaluate the desired variator torque capacity, which may be determined based upon monitored and estimated operating conditions related to an output power command, vehicle speed, engine torque, and other factors, using a variety of sensors to evaluate torque capacity parameters.

At step or block 204, the control system 10 detects and determines whether a critical vehicle event exists or a vehicle maneuver may be executed that could potentially disrupt or damage the CVT. In one example of the disclosure, the control system monitors a loss of vehicle traction such as a wheel slip event or the like, which could occur if one of the driving wheels is not in contact with the road surface, such as when hitting a pothole, or if the one of the driving wheels is in contact with a low-friction surface, such as ice.

If the control system 10 does not identify the existence or execution of a critical vehicle maneuver or event, the control system transmits feed forward instructions to the CVT with the desired variator torque capacity for operation of the CVT at step or block 206. The step 206 may confirm that the initial minimum clamping pressure applied in step 201 should be applied and/or continued.

Should the one or more sensors detect the existence or execution of a critical vehicle maneuver or event in step 204, the control system in electrical communication with the one or more sensors, at step or block 208, will evaluate the sensor feedback to identify the event or maneuver and adjust operation of the CVT 140, as will be described in greater detail below. Step or block 208 generally represents a compensation strategy used by the control system 10 to identify the type of critical event or maneuver and apply at least one control element to the variator assembly of the CVT 140 to avoid damage or abuse to the CVT 140.

The control system detection strategy of the control system 10 may be configured to identify any number of various disturbances, such as a generalized road disturbance, a sudden deceleration of the vehicle, and/or a rolling change of direction of the vehicle, by way of example. Such disturbances are shown as generally being detected in step 214, and determining a resultant compensation strategy in step 216.

The control system 10 may be further configured to detect a wheel slip event, or loss of wheel traction, and to provide compensation to the CVT 140 torque capacity and/or clamping pressure if the wheel slip exceeds a predetermined threshold. A loss of wheel traction may include one or more of the following non-limiting events, such as a loss of wheel traction based on the wheel interaction with an ice, snow, gravel, or split friction surface.

Upon identification of a wheel slip event exceeding a predetermined threshold, which is detected at step 210, the control system 10 will determine a corrective action to protect the variator assembly of the CVT at step or block 212. The control system 10 may instruct the variator assembly 30 to clamp the belt or chain 40 at a higher clamping pressure. The control system 10 may adjust the clamping pressure being supplied to the pulleys 36, 38 to clamp the chain or belt 40 at the higher pressure in order to protect the CVT 140. The adjusted variator torque capacity may be limited to a range biased higher than the initial variator torque capacity to avoid applying more torque at the wheels thereby exacerbating the traction event. The adjustment of the variator torque capacity and/or the clamping pressure in the CVT 140 may have a similar effect to a downshift in a step gear transmission to protect the CVT 140 from damage.

In step 210, the control system 10 may detect the loss of wheel traction by evaluating the differential between wheel speeds, which may be identified as wheel slip, to determine if a threshold has been exceeded between the driven and non-driven wheels, or between first and second driven wheels. The control system 10 may identify and classify loss of traction events based on individual wheel speeds or use of individual wheel speeds and vehicle acceleration to identify a loss of traction event.

Upon identification of the loss of wheel traction, the control system 10 will instruct corrective action to mitigate damage or abuse to the CVT 140 and protect the variator assembly 30 of the CVT 140 as shown in step or block 212. As described above, the control system 10 may instruct the variator assembly 30 to increase clamping pressure on the belt or chain 40.

At step or block 224, the control system 10, based upon detection of the critical event or maneuver, applies the corrective action identified in block 208 to set the appropriate limit ratio or adjusted variator torque capacity from the compensation strategy to correct for the critical event. It should be understood that step 224 can be combined into steps 212 and/or 216 in some examples.

The adjusted variator torque capacity or clamping pressure from block 224 or approved limit variator torque capacity from step or block 206 are transmitted to the CVT at step or block 226 to apply the desired adjustment to the clamping pressure and/or change in the variator torque capacity to the CVT 140.

Figure 4A:
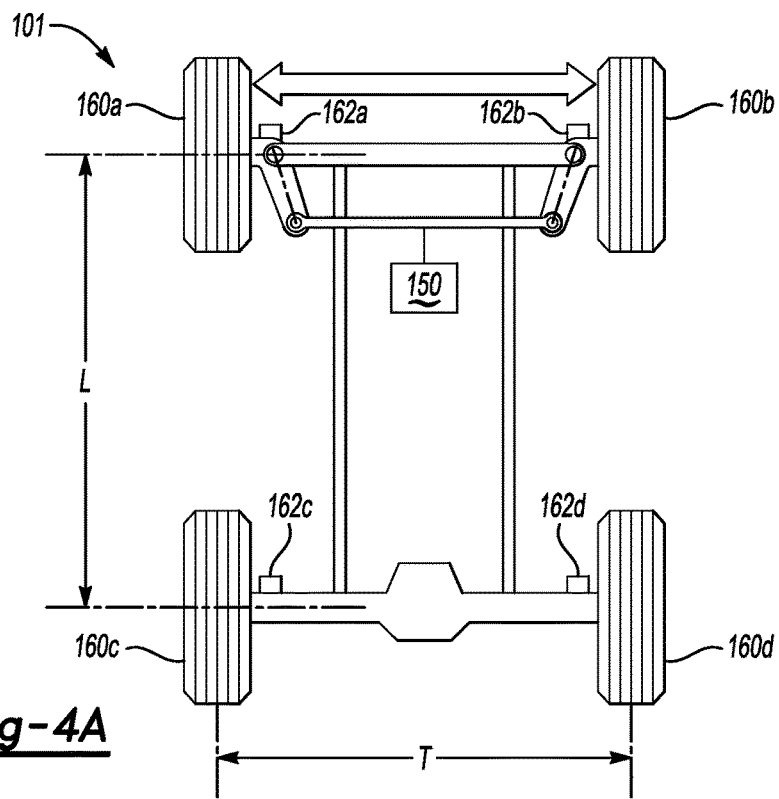
FIG. 4A illustrates schematically a vehicle including the wheels of the motor vehicle propulsion system shown in FIG. 1, according to the principles of the present disclosure.
Figure 4B:
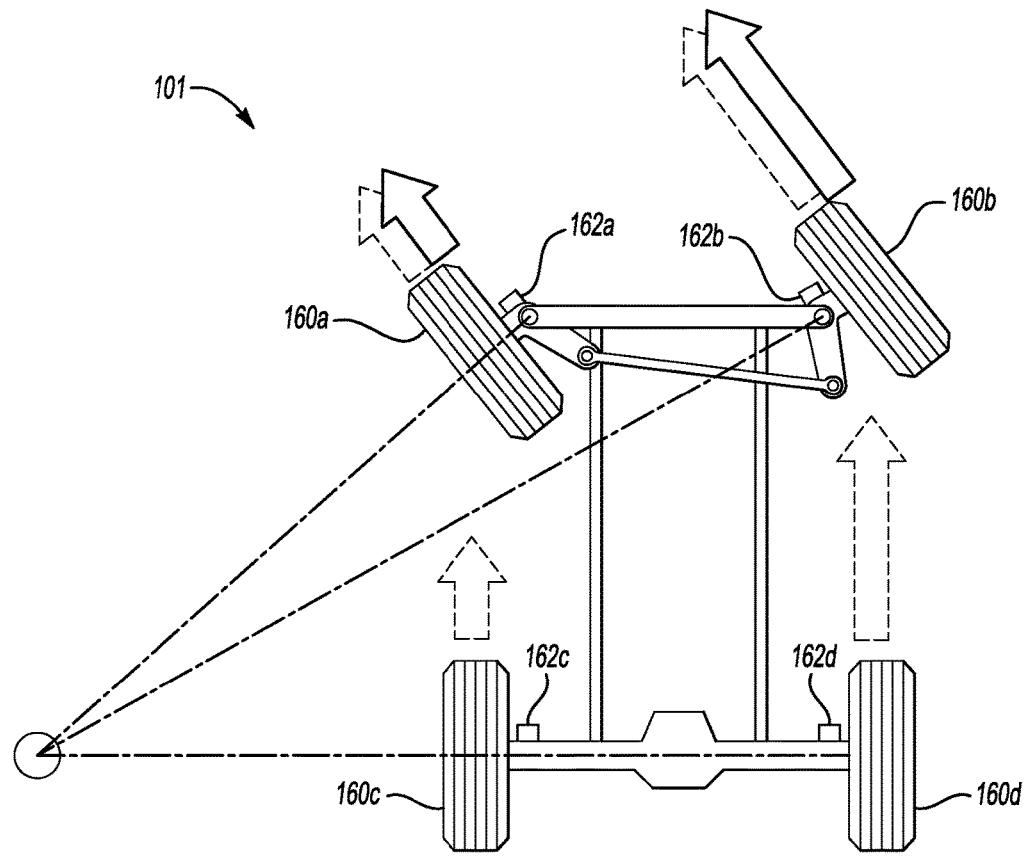
FIG. 4B illustrates schematically the vehicle of FIG. 4A executing a left turn, in accordance with the principles of the present disclosure.
Figure 5:
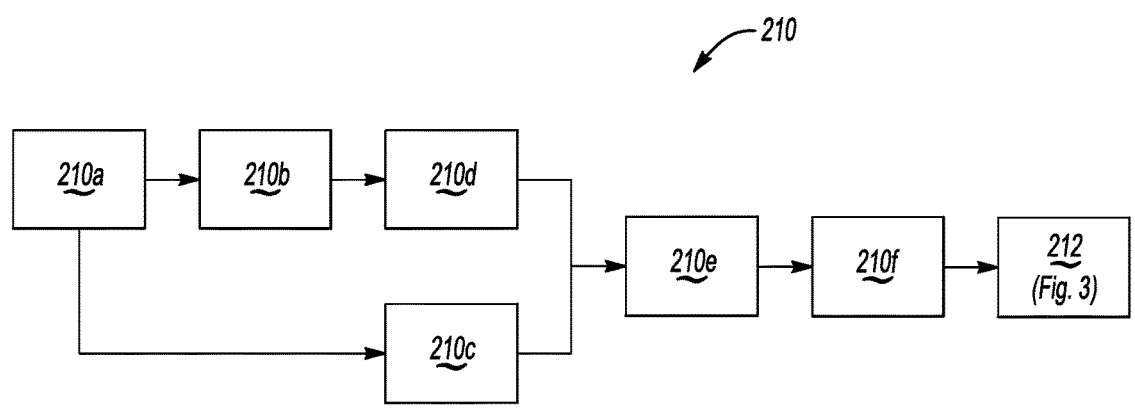
FIG. 5 illustrates a block diagram of a detailed portion of a step 210 of the CVT control system and method illustrated in FIG. 3, in accordance with the principles of the present disclosure.

Referring now to FIGS. 4A-4B and 5, additional details of the wheel slip detection and compensation strategy illustrated in steps 210 and 212 are illustrated. FIG. 4A shows a vehicle 101 having the four wheels 160*a-d* shown earlier in FIG. 1, including the wheel speed sensors 162*a-d*. In this example, a front-wheel drive vehicle 101 is shown, where the front left wheel 160*a* and the front right wheel 160*b* are driven by the vehicle propulsion system 100 through the driveline 150. Thus, the front left wheel 160*a* and the front right wheel 160*b* are identified as driving wheels because these are the wheels to which torque is applied. The left rear wheel 160*c* and the right rear wheel 160*d* are called driven wheels, to which no torque is applied. Although a front wheel drive configuration is shown, it should be understood that in the alternative, the propulsion system 100 may be coupled to a rear wheel drive vehicle where the rear wheels 160*c-d* are the driving wheels and the front wheels 160*a-b* are the driven wheels.

Referring to FIG. 4B, the vehicle 101 is shown effectuating a left turn. When the vehicle 101 is turning, the wheels 160*a-d* will not all spin at the same speed; instead, the outside wheels 160*b*, 160*d* (shown on the right side in FIG. 4B) will need to spin much faster and travel a greater distance than the inside left wheels 160*a*, 160*c*, in order to smoothly complete the left turn. Differences in wheels speeds between each of the wheels 160*a-d* will be detected by the wheel speed sensors 162*a-d*.

Referring now to FIG. 5, an additional control process for detecting and compensating for wheel speed differences as part of step 210 is provided. The step 210 includes a sub-step 210*a* of measuring wheels speeds, or determining measured wheel speeds, which includes measuring or determining the measured wheel speeds of both of the driven rear wheels 160*c*, 160*d* and of at least one of the driving front wheels 160*a*, 160*b* via wheel speed sensors 162*a-d*. The wheels speeds are generally measured in revolutions per minute (rpm), in this example.

The step 210 includes another sub-step 210*b* of calculating at least one driving wheel expected speed. The expected speeds of the driving wheels 160*a-b* can be calculated based on the measured speeds of the driven wheels 160*c-d*, the wheel base L, and the track width T. For example, the following Ackerman equation can be used to calculate the speed of one of the driving wheels 160*a-b*, based on the geometry of the vehicle 101 and the measured driven wheel speeds:

$$VP1 = \frac{\sqrt{(L*DV)^2 + (T*VD1)^2}}{T} \quad (1)$$

where VP1 is the first wheel expected speed, L is the wheel base, DV is the absolute value of the difference between the measured wheel speed of the first driven wheel and the measured wheel speed of the second driven wheel, T is the track width, and VD1 is the measured wheel speed of the first driven wheel. The "1" of VP1 and VD1 indicates that the driven wheel and the driving wheel "1" are located on the same side of the vehicle 101. For example, VP1 and VD1 may be used to indicate the left driving wheel expected speed and the left driven wheel measured speed; or VP1 and VD1 may be used to indicate the right driving wheel expected speed and the right driven wheel measured speed.

Thus, an additional way to write the Ackerman equation as applied herein is as follows, for the left side:

$$VPL = \frac{\sqrt{(L*DV)^2 + (T*VDL)^2}}{T} \quad (2)$$

where VPL is the left driving wheel expected speed, L is the wheel base, DV is the absolute value of the difference between the measured wheel speed of the left driven wheel and the measured wheel speed of the right driven wheel, T is the track width, and VDL is the measured wheel speed of the left driven wheel. In this case, the left driving wheel is the front left wheel 160*a* and the left driven wheel is the rear left wheel 160*c*.

An additional way to write the Ackerman equation as applied herein is as follows, for the right side:

$$VPR = \frac{\sqrt{(L*DV)^2 + (T*VDR)^2}}{T} \quad (3)$$

where VPR is the right driving wheel expected speed, L is the wheel base, DV is the absolute value of the difference between the measured wheel speed of the left driven wheel and the measured wheel speed of the right driven wheel, T is the track width, and VDR is the measured wheel speed of the right driven wheel. In this case, the right driving wheel is the front right wheel 160*b* and the right driven wheel is the rear right wheel 160*d*.

Accordingly, an expected speed of each of the driving wheels 160*a*, 160*b* can be calculated, which is based on vehicle geometry and speed of the driven wheels 160*c*, 160*d* (which are generally much less affected by wheel slip conditions because no torque is being applied to them).

The step 210 also includes a sub-step 210*c* wherein an actual wheel speed difference is calculated between the measured wheel speed of the first driving wheel, such as the left driving wheel 160*a*, and a measured wheel speed of an additional wheel. The additional wheel is one of the following: one of the driven wheels 160*c-d*, or the other driving wheel 160*b*. This sub-step 210*c* can be performed independently of the sub-step 210*b*, such as before, after, or simultaneously with the sub-step 210*b*.

The step 210 includes another sub-step 210*d* that follows from the sub-step 210*b*. In sub-step 210*d*, the method 200 includes calculating a theoretical wheel speed difference between the first driving wheel expected speed (calculated in sub-step 210*b*), and the measured wheel speed of the additional wheel, which could be any of the other wheels 160*b-d*.

A sub-step 210*e* uses and/or compares the results of sub-steps 210*c* and 210*d*. In sub-step 210*e*, the method 200 includes calculating a zeroed-out wheel slip based on the difference between the actual wheel speed difference and the theoretical wheel speed difference. In other words, the calculated wheel speed difference due to turning is subtracted from the measured wheel slip. The difference is the actual slip of the driving wheel that is due to road conditions and for which clamping may be required. Thus, in sub-step 210*f*, the method 200 includes determining whether the zeroed-out wheel slip exceeds a predetermined threshold.

The predetermined threshold could be, for example, 10-40 rpm, or 20 rpm, in some examples.

If the predetermined threshold is exceeded in sub-step 210f, then the method 200 returns to main step 212 shown in FIG. 3 to determine a compensation strategy appropriate for compensating for an actual wheel slip that is not falsely high due to wheel speed differences based on turning. Thus, the method 200 also includes commanding an initial minimum clamping pressure to be applied to the variator assembly to achieve a desired torque capacity in step 201, and then if a compensation strategy is needed due to the zeroed-out wheel slip exceeding the predetermined threshold, the method 200 includes commanding an adjustment to the initial minimum clamping pressure to compensate for the zeroed-out wheel slip in step 224, after determining the compensation strategy in step 212.

Figure 6:
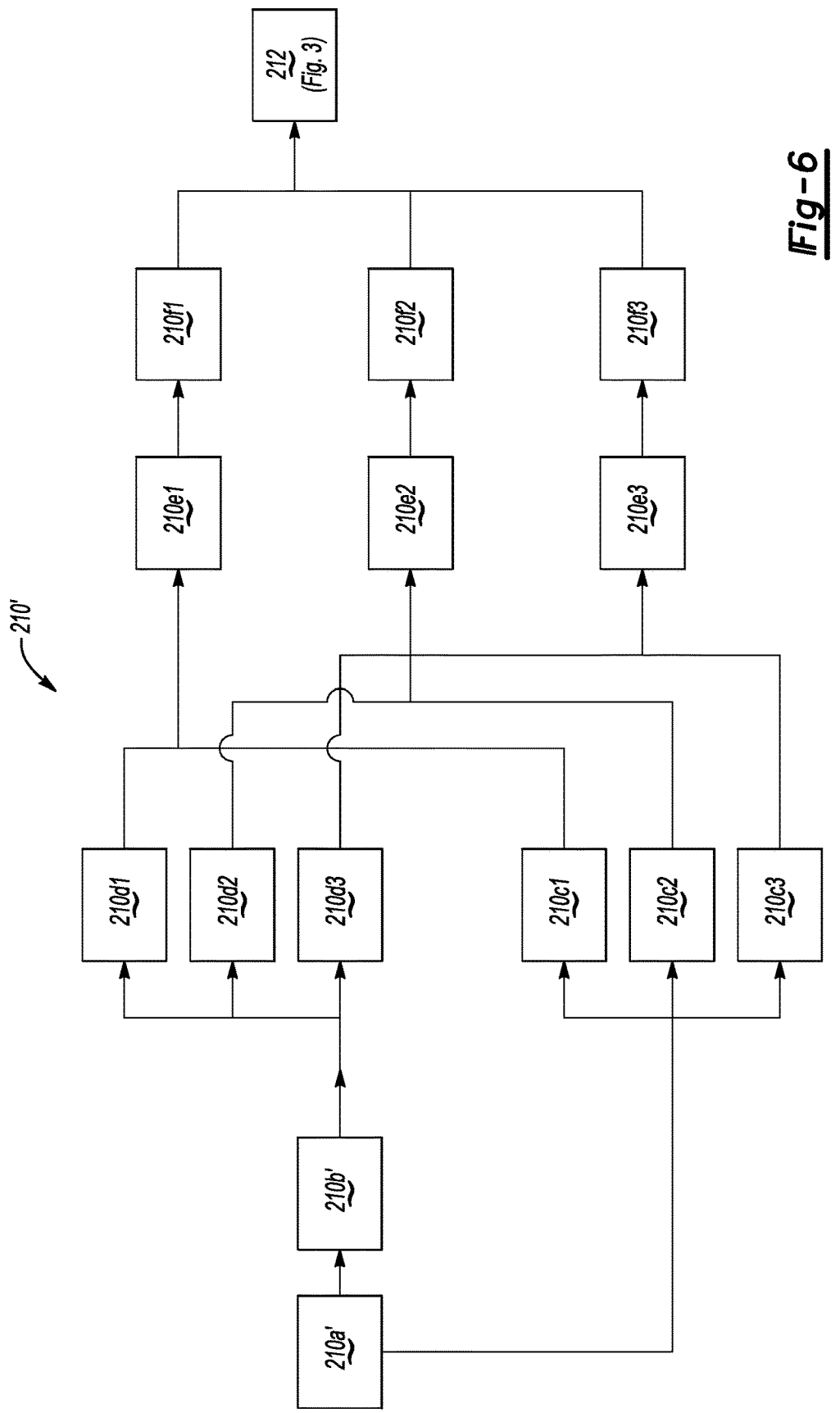
FIG. 6 illustrates a block diagram of another variation of the detailed portion of the step 210 (deemed step 210') of the CVT control system and method illustrated in FIG. 3, according to the principles of the present disclosure.

Referring now to FIG. 6, another detailed version of step 210 of FIG. 3 is illustrated and generally designated at 210'. The variation illustrated in FIG. 6 for step 210' includes a sub-step 210a' of measuring wheels speeds of each wheel 160a-d, or determining measured wheel speeds, which includes measuring or determining the measured wheel speeds at both of the driven rear wheels 160c, 160d and both of the driving front wheels 160a, 160b via wheel speed sensors 162a-d.

The variation of step 210' includes a sub-step 210b' of calculating driving wheel expected speeds for both driving wheels 160a, 160b. The expected speeds of the driving wheels 160a-b can be calculated based on the measured speeds of the driven wheels 160c-d, the wheel base L, and the track width T. For example, the expected speed for the left driving wheel (front left wheel 160a) can be calculated using equation (2) above, and the expected speed for the right driving wheel (front right wheel 160b) can be calculated using equation (3) above.

Independently of calculating the expected speeds of the driving wheels in sub-step 210b', sub-steps 210c1, 210c2, and 210c3 are performed to calculate actual wheel speed differences. Thus, in sub-step 210c1, an actual wheel speed difference is calculated between the wheel speeds of the front left wheel 160a and the rear left wheel 160c, as measured by the wheel speed sensors 162a and 162c respectively. In sub-step 210c2, an actual wheel speed difference is calculated between the wheel speeds of the front right wheel 160b and the rear right wheel 160d, as measured by the wheel speed sensors 162b and 162d respectively. In sub-step 210c3, an actual wheel speed difference is calculated between the wheel speeds of the front left wheel 160a and the front right wheel 160b, as measured by the wheel speed sensors 162a and 162b respectively.

The step 210' includes another set of sub-steps: 210d1, 210d2, 210d3, which follow from the sub-step 210b'. In sub-step 210d1, the method 200 includes calculating a left-side theoretical wheel speed difference between the left driving wheel expected speed (calculated in sub-step 210b') and the measured wheel speed of the left rear wheel 160c. In sub-step 210d2, the method 200 includes calculating a right-side theoretical wheel speed difference between the right driving wheel expected speed (calculated in sub-step 210b') and the measured wheel speed of the right rear wheel 160d. In sub-step 210d3, the method 200 includes calculating a front-side, or driving-side, theoretical wheel speed difference between the left driving wheel expected speed (calculated in sub-step 210b') and the measured wheel speed of the right front wheel 160b. In the alternative, sub-step 210d3 could include calculating a front-side, or driving-side, theoretical wheel speed difference between the right driving wheel expected speed (calculated in sub-step 210b') and the measured wheel speed of the left front wheel 160a.

A set of sub-steps 210e1, 210e2, 210e3 use and/or compare the results of sub-steps 210c1, 210c2, 210c3 and 210d1, 210d2, 210d3, respectively. For example, in sub-step 210e1, the method 200 includes calculating a zeroed-out wheel slip based on the difference between the actual wheel speed difference between the left driving (front) wheel 160a and the left driven (rear) wheel 160c calculated in sub-step 210c1, and the left-side theoretical wheel speed difference calculated in sub-step 210d1. In sub-step 210e2, the method 200 includes calculating a zeroed-out wheel slip based on the difference between the actual wheel speed difference between the right driving (front) wheel 160b and the right driven (rear) wheel 160d calculated in sub-step 210c2, and the right-side theoretical wheel speed difference calculated in sub-step 210d2. In sub-step 210e3, the method 200 includes calculating a zeroed-out wheel slip based on the difference between the actual wheel speed difference between the left driving (front) wheel 160a and the right driving (front) wheel 160b calculated in sub-step 210c3, and the front-side theoretical wheel speed difference calculated in sub-step 210d3.

In other words, the calculated wheel speed differences due to turning are subtracted from the measured wheel slip for the left side, the right side, and the front side (or the driving side). These differences are the actual slip of the driving wheels 160a-b that are due to road conditions and for which clamping may be required. Thus, in sub-step 210f1, the method 200 includes determining whether the zeroed-out wheel slip for the left side exceeds one predetermined threshold. In sub-step 210f2, the method 200 includes determining whether the zeroed-out wheel slip for the right side exceeds another predetermined threshold. The predetermined thresholds for the left and right sides for zeroed-out wheel slip may be the same, such as 5-10, 10-40 rpm, or about 20 rpm, by way of example. This threshold can be much lower than the threshold could be if the wheel speed differences due to turning were not subtracted from the measured wheel speed differences.

In sub-step 210f3, the method 200 includes determining whether the zeroed-out wheel slip for the front side exceeds yet another predetermined threshold. The front side predetermined threshold may be different or the same as the left and right side predetermined thresholds.

If any of the predetermined thresholds are exceeded in sub-steps 210f1, 210f2, 210f3, then the method 200 returns to main step 212 shown in FIG. 3 to determine a compensation strategy appropriate for compensating for an actual wheel slip that is not falsely high due to wheel speed differences based on turning. Thus, the method 200 also includes commanding an initial minimum clamping pressure to be applied to the variator assembly to achieve a desired torque capacity in step 201, and then if a compensation strategy is needed due to the zeroed-out wheel slip exceeding the predetermined threshold, the method 200 includes commanding an adjustment to the initial minimum clamping pressure to compensate for the zeroed-out wheel slip in step 224, after determining the compensation strategy in step 212.

The control system 10 may be configured to execute each of the steps illustrated in FIGS. 3, 5, and/or 6. For example, the control system 10 can be configured to command an initial minimum clamping pressure to be applied to the variator assembly to achieve a desired torque capacity, as described with respect to block 201. The control system 10 can be configured to determine measured wheel speeds of each of the driven wheels 160c-d and at least one of the driving wheels 160a-b, for example, as described with respect to blocks 210a and 210a'. The control system 10 may be further configured to calculate a left or right driving wheel expected speed based on the measured wheel speeds of the right and left driven wheels 160c-d, a track width T, and a wheel base L, as described with respect to blocks 210b and 210b', as well as equations (1)-(3) above. The control system 10 may then be configured to calculate an actual wheel speed difference between the measured wheel speed of one of the driving wheels 160a-b and one additional wheel, which may be either driven wheel 160c-d or the other driving wheel 160a-b, such as described with respect to blocks 210c, 210c1, 210c2, and 210c3.

The control system 10 may also be configured to calculate a theoretical wheel speed difference between the left or right driving wheel expected speed and the measured wheel speed of the additional wheel, such as described above with respect to blocks 210d, 210d1, 210d2, and 210d3. Further, the control system 10 may be configured to calculate a zeroed-out wheel slip based on the difference between the actual wheel speed difference calculated in steps 210c, 210c1, 210c2, and/or 210c3 and the theoretical wheel speed difference calculated in steps 210d, 210d1, 210d2, and/or 210d3, respectively, as described above with respect to blocks 210e, 210e1, 210e2, and 210e3. The control system 10 may also be configured to determine whether the zeroed-out wheel slip calculated in blocks 210e, 210e1, 210e2, and/or 210e3 exceeds a predetermined threshold, such as described above with respect to blocks 210f, 210f1, 210f2, and 210f3. If the zeroed-out wheel slip exceeds the predetermined threshold(s), the control system 10 may be configured to command an adjustment to the initial minimum clamping pressure applied to the variator assembly to compensate for the zeroed-out wheel slip, such as described in blocks 212 and 224. Thus, the entire description of FIGS. 3, 5, and 6 may be applied to the control system 10 to effectuate the method 200, such as by using the Ackerman equations (1)-(3).

Furthermore, the controller 12 may be or include a transmission controller that includes a number of control logics that are configured to execute the steps of the method 200 explained above.

The controller 12 of the control system 10 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

Previous implementations of wheel slip algorithms to protect the CVT typically used a threshold of at least 40 rpm difference in wheel speeds before a wheel slip was determined in step 210. This was because the wheel slip due to turning was ignored, and thus needed to be ruled out as a cause for the wheel speed differences. However, a wheel slip of 20 rpm may be the desired protection point for wheel slip due to road disturbances, so the 40 rpm threshold may be too high to account for all rough road disturbances. Other systems may have used a lower wheel slip threshold, but then resulted in false wheel slip correction when the vehicle was merely turning and there was no actual wheel slip. Accordingly, with the present method, system, and CVT taught herein, if the wheel slip due to turning is subtracted from the actual wheel slip, then the CVT 140 can be controlled at lower tolerances, such as clamping when only 5, 10, or 20 rpm of actual wheel slip is detected, which will result in correction at the right level without falsely correcting due to turning. The clamping control system may thus react to much lower wheel slip with confidence.

The detailed description and the drawings or figures are supportive and descriptive of the disclosure, but the scope of the disclosure is defined solely by the claims. While some of the best modes and other examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for controlling a continuously variable transmission (CVT) including a variator assembly for a motor vehicle, the method comprising:
   determining a measured wheel speed of a first driven wheel;
   determining a measured wheel speed of a second driven wheel;
   determining a measured wheel speed of a first driving wheel;
   calculating a first driving wheel expected speed based on the measured wheel speeds of the first and second driven wheels, a track width, and a wheel base;
   calculating an actual wheel speed difference between the measured wheel speed of the first driving wheel and a measured wheel speed of an additional wheel, the additional wheel being one of the following: the first driven wheel, the second driven wheel, and a second driving wheel;

calculating a theoretical wheel speed difference between the first driving wheel expected speed and the measured wheel speed of the additional wheel;

calculating a zeroed-out wheel slip based on the difference between the actual wheel speed difference and the theoretical wheel speed difference;

determining whether the zeroed-out wheel slip exceeds a predetermined threshold;

commanding an initial minimum clamping pressure to be applied to the variator assembly to achieve a desired torque capacity; and if the zeroed-out wheel slip exceeds the predetermined threshold, commanding an adjustment to the initial minimum clamping pressure to compensate for the zeroed-out wheel slip.

2. The method of claim 1, wherein the step of calculating the first driving wheel expected speed is calculated using the following equation:

$$VP1 = \frac{\sqrt{(L*DV)^2 + (T*VD1)^2}}{T}$$

where VP1 is the first driving wheel expected speed, L is the wheel base, DV is the absolute value of the difference between the measured wheel speed of the first driven wheel and the measured wheel speed of the second driven wheel, T is the track width, and VD1 is the measured wheel speed of the first driven wheel.

3. The method of claim 2, further comprising providing the additional wheel as the first driven wheel.

4. The method of claim 3, the actual wheel speed difference being a first actual wheel speed difference, the theoretical wheel speed difference being a first theoretical wheel speed difference, the zeroed-out wheel slip being a first zeroed-out wheel slip, and the predetermined threshold being a first predetermined threshold, the method further comprising:

calculating a second driving wheel expected speed based on the measured wheel speeds of the first and second driven wheels, the track width, and the wheel base;

calculating a second actual wheel speed difference between the measured wheel speed of the second driving wheel and the measured wheel speed of the second driven wheel;

calculating a second theoretical wheel speed difference between the second driving wheel expected speed and the measured wheel speed of the second driven wheel;

calculating a second zeroed-out wheel slip based on the difference between the second actual wheel speed difference and the second theoretical wheel speed difference; and determining whether the second zeroed-out wheel slip exceeds a second predetermined threshold.

5. The method of claim 4, the method further comprising:
calculating a third actual wheel speed difference between the measured wheel speed of the second driving wheel and the measured wheel speed of the first driving wheel;

calculating a third theoretical wheel speed difference between the first driving wheel expected speed and the measured wheel speed of the second driving wheel;

calculating a third zeroed-out wheel slip based on the difference between the third actual wheel speed difference and the third theoretical wheel speed difference; and determining whether the third zeroed-out wheel slip exceeds a third predetermined threshold.

6. The method of claim 5, further comprising:
if the second zeroed-out wheel slip exceeds the second predetermined threshold, commanding an adjustment to the initial minimum clamping pressure to compensate for the second zeroed-out wheel slip; and if the third zeroed-out wheel slip exceeds the third predetermined threshold, commanding an adjustment to the initial minimum clamping pressure to compensate for the third zeroed-out wheel slip.

7. A transmission control system for controlling a continuously variable transmission (CVT) having a variator assembly, the transmission control system comprising an instruction set, the instruction set executable to:

command an initial minimum clamping pressure to be applied to the variator assembly to achieve a desired torque capacity;

determine a measured wheel speed of a first driven wheel;

determine a measured wheel speed of a second driven wheel;

determine a measured wheel speed of a first driving wheel;

calculate a first driving wheel expected speed based on the measured wheel speeds of the first and second driven wheels, a track width, and a wheel base;

calculate an actual wheel speed difference between the measured wheel speed of the first driving wheel and a measured wheel speed of an additional wheel, the additional wheel being one of the following: the first driven wheel, the second driven wheel, and a second driving wheel;

calculate a theoretical wheel speed difference between the first driving wheel expected speed and the measured wheel speed of the additional wheel;

calculate a zeroed-out wheel slip based on the difference between the actual wheel speed difference and the theoretical wheel speed difference;

determine whether the zeroed-out wheel slip exceeds a predetermined threshold; and if the zeroed-out wheel slip exceeds the predetermined threshold, command an adjustment to the initial minimum clamping pressure applied to the variator assembly to compensate for the zeroed-out wheel slip.

8. The transmission control system of claim 7, the transmission control system being configured to calculate the first driving wheel expected speed using the following equation:

$$VP1 = \frac{\sqrt{(L*DV)^2 + (T*VD1)^2}}{T}$$

where VP1 is the first driving wheel expected speed, L is the wheel base, DV is the absolute value of the difference between the measured wheel speed of the first driven wheel and the measured wheel speed of the second driven wheel, T is the track width, and VD1 is the measured wheel speed of the first driven wheel.

9. The transmission control system of claim 8, wherein the additional wheel is the first driven wheel, the actual wheel speed difference being a first actual wheel speed difference, the theoretical wheel speed difference being a first theoretical wheel speed difference, the zeroed-out wheel slip being a first zeroed-out wheel slip, and the predetermined threshold being a first predetermined threshold, the transmission control system being further configured to:
calculate a second driving wheel expected speed based on the measured wheel speeds of the first and second driven wheels, the track width, and the wheel base;
calculate a second actual wheel speed difference between the measured wheel speed of the second driving wheel and the measured wheel speed of the second driven wheel;
calculate a second theoretical wheel speed difference between the second driving wheel expected speed and the measured wheel speed of the second driven wheel;
calculate a second zeroed-out wheel slip based on the difference between the second actual wheel speed difference and the second theoretical wheel speed difference;
determine whether the second zeroed-out wheel slip exceeds a second predetermined threshold;
calculate a third actual wheel speed difference between the measured wheel speed of the second driving wheel and the measured wheel speed of the first driving wheel;
calculate a third theoretical wheel speed difference between the first driving wheel expected speed and the measured wheel speed of the second driving wheel;
calculate a third zeroed-out wheel slip based on the difference between the third actual wheel speed difference and the third theoretical wheel speed difference;
determine whether the third zeroed-out wheel slip exceeds a third predetermined threshold;
if the second zeroed-out wheel slip exceeds the second predetermined threshold, command an adjustment to the initial minimum clamping pressure to be applied to the variator assembly to compensate for the second zeroed-out wheel slip; and
if the third zeroed-out wheel slip exceeds the third predetermined threshold, command an adjustment to the initial minimum clamping pressure applied to the variator assembly to compensate for the third zeroed-out wheel slip.

10. A transmission controller for controlling a continuously variable transmission (CVT) having a variator assembly, the transmission controller comprising:
a first control logic configured to determine a measured wheel speed of a first driven wheel, a measured wheel speed of a second driven wheel, and a measured wheel speed of a first driving wheel;
a second control logic configured to calculate a first driving wheel expected speed based on the measured wheel speeds of the first and second driven wheels, a track width, and a wheel base;
a third control logic configured to calculate an actual wheel speed difference between the measured wheel speed of the first driving wheel and a measured wheel speed of an additional wheel, the additional wheel being one of the following: the first driven wheel, the second driven wheel, and a second driving wheel;
a fourth control logic configured to calculate a theoretical wheel speed difference between the first driving wheel expected speed and the measured wheel speed of the additional wheel;
a fifth control logic configured to calculate a zeroed-out wheel slip based on the difference between the actual wheel speed difference and the theoretical wheel speed difference;
a sixth control logic configured to determine whether the zeroed-out wheel slip exceeds a predetermined threshold;
a seventh control logic configured to command an initial minimum clamping pressure to be applied to the variator assembly to achieve a desired torque capacity; and
an eighth control logic configured to command an adjustment to the initial minimum clamping pressure to be applied to the variator assembly to compensate for the zeroed-out wheel slip if the zeroed-out wheel slip exceeds the predetermined threshold.

11. The transmission controller of claim 10, the second control logic being configured to calculate the first driving wheel expected speed using the following equation:

$$VP1 = \frac{\sqrt{(L*DV)^2 + (T*VD1)^2}}{T}$$

where VP1 is the first driving wheel expected speed, L is the wheel base, DV is the absolute value of the difference between the measured wheel speed of the first driven wheel and the measured wheel speed of the second driven wheel, T is the track width, and VD1 is the measured wheel speed of the first driven wheel.

12. The transmission controller of claim 11, wherein the additional wheel is the first driven wheel, the actual wheel speed difference being a first actual wheel speed difference, the theoretical wheel speed difference being a first theoretical wheel speed difference, the zeroed-out wheel slip being a first zeroed-out wheel slip, and the predetermined threshold being a first predetermined threshold, the transmission controller further comprising:
a ninth control logic configured to calculate a second driving wheel expected speed based on the measured wheel speeds of the first and second driven wheels, the track width, and the wheel base;
a tenth control logic configured to calculate a second actual wheel speed difference between the measured wheel speed of the second driving wheel and the measured wheel speed of the second driven wheel;
an eleventh control logic configured to calculate a second theoretical wheel speed difference between the second driving wheel expected speed and the measured wheel speed of the second driven wheel;
a twelfth control logic configured to calculate a second zeroed-out wheel slip based on the difference between the second actual wheel speed difference and the second theoretical wheel speed difference;
a thirteenth control logic configured to determine whether the second zeroed-out wheel slip exceeds a second predetermined threshold;
a fourteenth control logic configured to calculate a third actual wheel speed difference between the measured wheel speed of the second driving wheel and the measured wheel speed of the first driving wheel;
a fifteenth control logic configured to calculate a third theoretical wheel speed difference between the first driving wheel expected speed and the measured wheel speed of the second driving wheel;
a sixteenth control logic configured to calculate a third zeroed-out wheel slip based on the difference between the third actual wheel speed difference and the third theoretical wheel speed difference;

a seventeenth control logic configured to determine whether the third zeroed-out wheel slip exceeds a third predetermined threshold;

an eighteenth control logic configured to command an adjustment to the initial minimum clamping pressure to be applied to the variator assembly to compensate for the second zeroed-out wheel slip if the second zeroed-out wheel slip exceeds the second predetermined threshold; and a nineteenth control logic configured to command an adjustment to the initial minimum clamping pressure to be applied to the variator assembly to compensate for the third zeroed-out wheel slip if the third zeroed-out wheel slip exceeds the third predetermined threshold.

13. A continuously variable transmission (CVT) for a motor vehicle, comprising:

a variator assembly including a first pulley and a second pulley, the first and second pulleys rotatably coupled by a continuous rotatable device, wherein the first pulley is rotatably coupled to an input member and the second pulley is rotatably coupled to an output member;

the first pulley including a first moveable sheave that is translatable along a first axis relative to a first stationary sheave in response to urging of a first actuator;

the second pulley including a second moveable sheave that is translatable along a second axis relative to a second stationary sheave in response to urging of a second actuator; and a control system having at least one controller and one or more sensors in communication with the controller, the control system including an instruction set, the instruction set executable to:

determine a measured wheel speed of a first driven wheel;

determine a measured wheel speed of a second driven wheel;

determine a measured wheel speed of a first driving wheel;

calculate a first driving wheel expected speed based on the measured wheel speeds of the first and second driven wheels, a track width, and a wheel base;

calculate an actual wheel speed difference between the measured wheel speed of the first driving wheel and a measured wheel speed of an additional wheel, the additional wheel being one of the following: the first driven wheel, the second driven wheel, and a second driving wheel;

calculate a theoretical wheel speed difference between the first driving wheel expected speed and the measured wheel speed of the additional wheel;

calculate a zeroed-out wheel slip based on the difference between the actual wheel speed difference and the theoretical wheel speed difference; and determine whether the zeroed-out wheel slip exceeds a predetermined threshold.

14. The continuously variable transmission (CVT) of claim 13, wherein the instruction set of the control system is further configured to execute the following instructions:

command the second actuator to apply an initial minimum clamping pressure to the variator assembly to achieve a desired torque capacity; and if the zeroed-out wheel slip exceeds the predetermined threshold, command an adjustment to the initial minimum clamping pressure applied to the variator assembly to compensate for the zeroed-out wheel slip.

15. The continuously variable transmission (CVT) of claim 14, wherein the control system is configured to calculate the first driving wheel expected speed using the following equation:

$$VP1 = \frac{\sqrt{(L*DV)^2 + (T*VD1)^2}}{T}$$

where VP1 is the first driving wheel expected speed, L is the wheel base, DV is the absolute value of the difference between the measured wheel speed of the first driven wheel and the measured wheel speed of the second driven wheel, T is the track width, and VD1 is the measured wheel speed of the first driven wheel.

16. The continuously variable transmission (CVT) of claim 15, wherein the additional wheel is the first driven wheel, the actual wheel speed difference being a first actual wheel speed difference, the theoretical wheel speed difference being a first theoretical wheel speed difference, the zeroed-out wheel slip being a first zeroed-out wheel slip, and the predetermined threshold being a first predetermined threshold, wherein the instruction set of the control system is further configured to execute the following instructions:

calculate a second driving wheel expected speed based on the measured wheel speeds of the first and second driven wheels, the track width, and the wheel base;

calculate a second actual wheel speed difference between the measured wheel speed of the second driving wheel and the measured wheel speed of the second driven wheel;

calculate a second theoretical wheel speed difference between the second driving wheel expected speed and the measured wheel speed of the second driven wheel;

calculate a second zeroed-out wheel slip based on the difference between the second actual wheel speed difference and the second theoretical wheel speed difference;

determine whether the second zeroed-out wheel slip exceeds a second predetermined threshold; and command an adjustment to the initial minimum clamping pressure applied to the variator assembly to compensate for the second zeroed-out wheel slip if the second zeroed-out wheel slip exceeds the second predetermined threshold.

17. The continuously variable transmission (CVT) of claim 16, wherein the instruction set of the control system is further configured to execute the following instructions:

calculate a third actual wheel speed difference between the measured wheel speed of the second driving wheel and the measured wheel speed of the first driving wheel;

calculate a third theoretical wheel speed difference between the first driving wheel expected speed and the measured wheel speed of the second driving wheel;

calculate a third zeroed-out wheel slip based on the difference between the third actual wheel speed difference and the third theoretical wheel speed difference;

determine whether the third zeroed-out wheel slip exceeds a third predetermined threshold; and command an adjustment to the initial minimum clamping pressure applied to the variator assembly to compensate for the third zeroed-out wheel slip if the third zeroed-out wheel slip exceeds the third predetermined threshold.

* * * * *